May 4, 1926.
F. W. WEST
SPINDLE BRACKET
Filed July 13, 1922
1,583,378
2 Sheets-Sheet 1
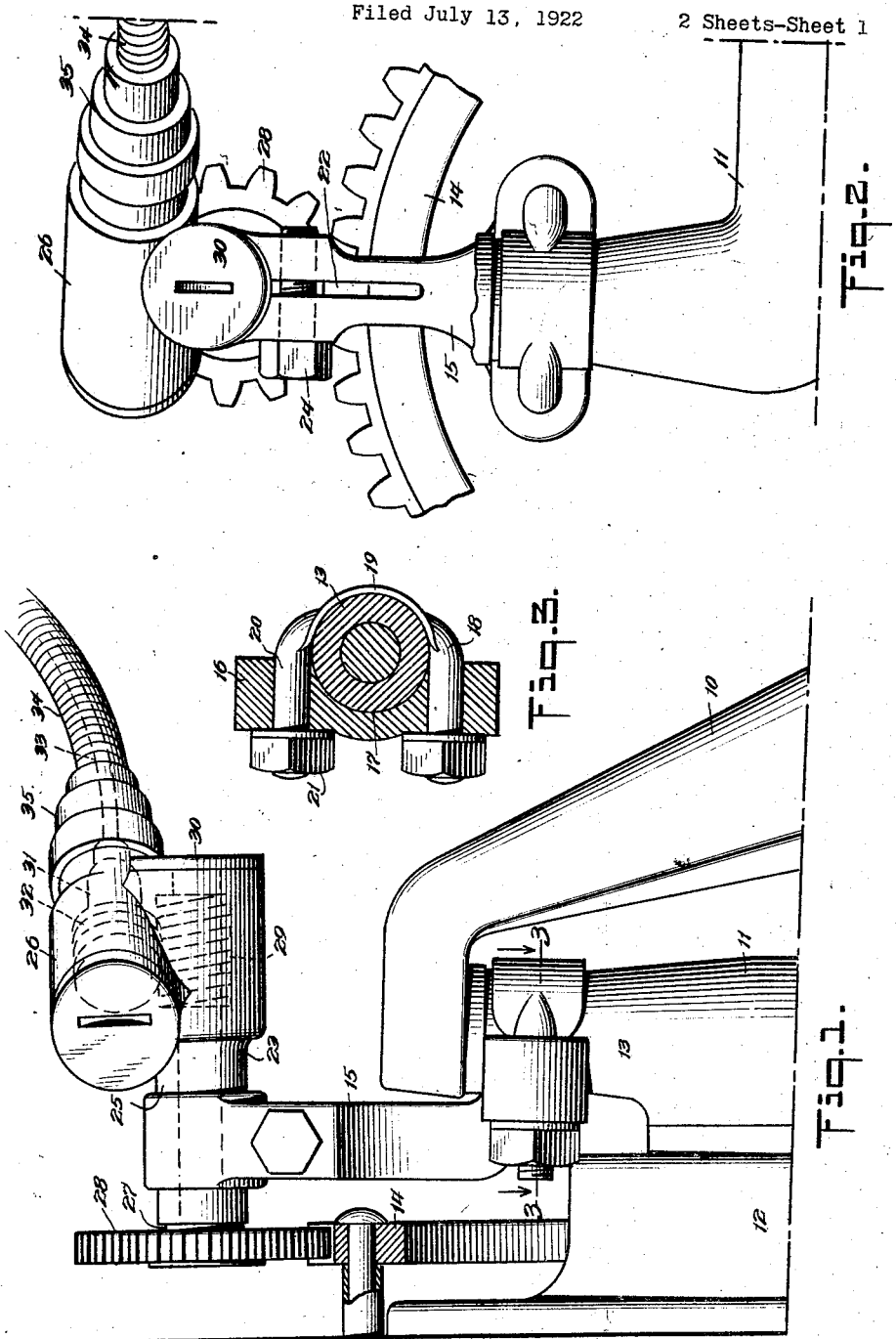
INVENTOR
Frank W. West
BY
ATTORNEY

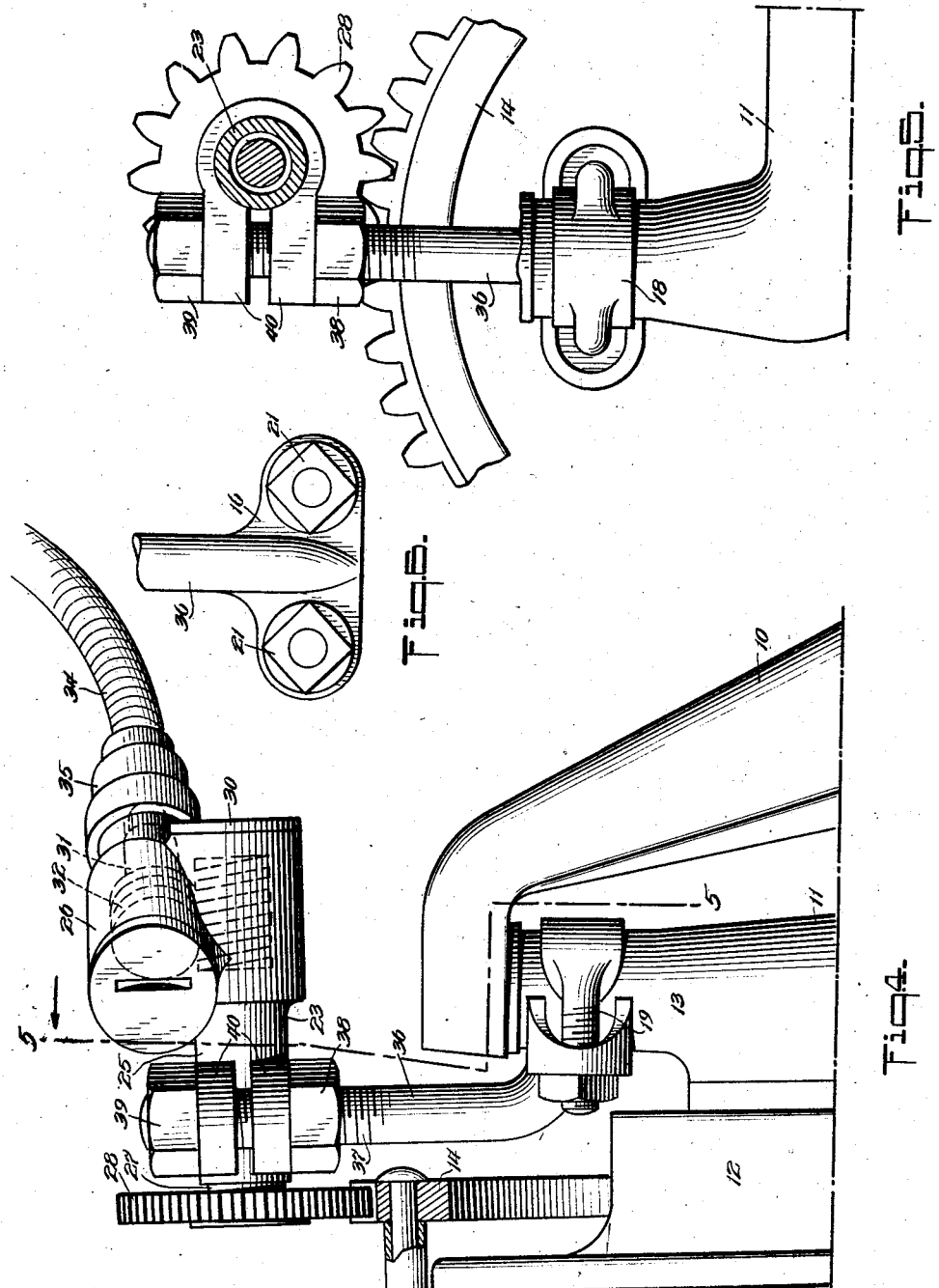

Patented May 4, 1926.

1,583,378

UNITED STATES PATENT OFFICE.

FRANK WILLIAM WEST, OF NEW ROCHELLE, NEW YORK, ASSIGNOR, BY MESNE ASSIGNMENTS, TO STEWART-WARNER SPEEDOMETER CORPORATION.

SPINDLE BRACKET.

Application filed July 13, 1922. Serial No. 574,732.

*To all whom it may concern:*

Be it known that I, FRANK W. WEST, a citizen of the United States, and resident of New Rochelle, in the county of Westchester and State of New York, have invented certain new and useful Improvements in Spindle Brackets, of which the following is a specification.

The invention relates to a speedometer drive of the type in which a gear driven shaft is mounted on the steering knuckle to turn therewith and disposed in permanent driving connection with a gear carried by the adjacent road wheel of a vehicle.

The invention specifically relates to a complete article of manufacture which constitutes an attachment provided with means for readily mounting the same in position on the spindle of the steering knuckle, and arranged to convey rotary motion from the road wheel to the usual form of flexible shafting commonly employed in driving vehicle speedometers.

The invention herein disclosed is particularly designed for use in connection with one form of vehicle in which the road wheel has a limited angularity of turn in steering the vehicle and in which the presence of parts of the car restrict the available space in which a speedometer drive might be conveniently disposed.

Accordingly, the primary object of the invention is to provide a simple form of attachment, which can be mounted at will on the steering knuckle of a car of such character, which will permit the maximum angular movement of the road wheel necessary to steer the vehicle but which at the same time will minimize the average arc of movement which will be necessary for the flexible shaft to take in order to accommodate itself to the different angular changes of the road wheel, and the invention further features such a directional disposition of the drive as will cause it to extend through an available free space, free of any contact with vehicle parts.

In the specific disclosure herein illustrated I attain this phase of the invention by utilizing two inter-geared shafts disposed with their axes held in relatively fixed position by the unitary bearing in which both shafts are mounted; by disposing one of the shafts perpendicular to the plane of the road wheel and in the available space above the spindle and with the other shaft extending at an angle of about 120° from the plane of the road wheel and its associated gear into an available space through which the flexible shaft may extend.

Another object of the invention is to provide a simple form of bearing into which the shafts may be easily inserted and which will provide a lubricant containing housing for the gear drive between the shafts.

Another object of the invention is to provide a simplified structure of the type outlined which may be readily designed so as to provide adjustability so that the drive may be modified to accommodate itself to different size wheel driven gears.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view in front elevation showing the upper part of a conventional form of steering knuckle and associated parts, with a preferred embodiment of the invention mounted thereon;

Figure 2 is a view in end elevation of the device shown in Figure 1 looking at the same from the right hand side;

Figure 3 is a horizontal sectional view taken on the line 3—3 of Figure 1;

Figure 4 is a view similar to Figure 1 showing a modified form to provide for vertical and horizontal adjustment;

Figure 5 is a transverse sectional view taken on the line 5—5 of Figure 4 looking in the direction of the arrow; and Figure 6 is a fragmentary view in elevation of the lower part of the upright spindle.

In the following description and in the claims, parts will be identified by specific names for convenience of expression but they are intended to be as generic in their application to similar parts as the art will permit.

In the drawings there is shown part of a conventional form of vehicle axle 10 pivotally supporting a steering knuckle 11 upon which is rotatably mounted the road wheel 12 and which knuckle includes an upstanding spindle 13.

As is usual in constructions where the speedometer is driven from the road wheel, it is provided on its inner side with a gear 14 co-axially positioned on the same outside of the knuckle.

The attachment herein featured includes an upstanding post 15 designed to be positioned between the upper part of the axle 10 and the wheel 12 and in the space above the spindle 13. As more particularly shown in Figure 3 the lower part of the post 15 is enlarged transversely to form a wide jaw plate 16 recessed on one side as shown at 17 to fit against the adjacent curved side of the spindle 13. A U-bolt 18 has a flat crotch position 19 which conforms to the configuration and engages the opposite side of the spindle. The legs 19 of the bolt are passed through openings in the plate 16 and are secured by means of nuts 21.

The upper portion of the post 15 is bifurcated by a slot 22 and a casting 23 hereinafter identified as a bearing member 23 fitted between the bifurcations and is demountably held in place by means of a jam nut 24 which acts to draw the bifurcations together and thus clamp the bearing in place.

The bearing comprises in effect two open ended tubular members 25 and 26 lapping each other and integrally connected to form a one piece unit with the two tubular members extending approximately 120° from each other. The tubular member 23 provides a bearing for a relatively short pinion shaft 27 fixed to one end of which is a pinion 28 permanently in mesh with the gear 14. The major portion of the shaft 27 is housed within the bearing 25 and is provided at the end opposite the gear 28 with a worm 29. The end of the bearing 25 adjacent the worm 29 is closed by means of an end cap 30.

Similarly the tubular bearing member 26 is provided with a speedometer shaft 31 journalled therein and provided with a worm 32 which is permanently in mesh with the worm 29 and thus provides an intergearing between the pinion shaft 27 and the end of the flexible shaft 33 which leads to the speedometer (not shown). As is usual the flexible shaft 33 is provided with a flexible sheathing or guard 34 which is secured to the free end of the tubular member 26 by a suitable form of coupling 35.

By means of a device of the type disclosed it is possible to make a convenient connection with the road wheel and to provide a shaft or flexible connection with the speedometer without restraining the angular movement of the road wheel and without causing the flexible shafting to contact with certain fixed parts of the car structure.

In the form so far described the attachment is of a standard size to fit standard constructions of vehicle wheels with a fixed gear ratio provided by the gears 14 and 28. In order to provide an attachment which can be accommodated to fit structures which are not standard it is suggested in the modified form (Figure 4) that the upright 36, corresponding to the post 15, be threaded as shown at 37. A pair of nuts 38 and 39 engage the threads and hold between them a bifurcated extension 40 projecting from one side of the bearing member 23.

By this construction it is possible to advance the nuts up or down the upright thus varying the vertical position of the bearing and the gear 28 and before tightening up the nuts the bearing may be shifted horizontally about the axis of the upright so that the speedometer shaft may extend in any desired direction from the plane of the gear 14.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination with a vehicle axle, a steering knuckle including an upstanding spindle pivoted at its upper end to the axle, a road wheel mounted on the steering knuckle, a driving gear carried by the wheel, of an attachment comprising an upstanding post positioned between the gear and spindle and projecting above the axle, means for fastening the lower end of the post directly to the upper portion of the spindle, a bearing member adjustably positioned in the upper end of the post, projecting on opposite sides thereof and overlapping the spindle and axle, a speedometer driving shaft journalled in said member, and a driven pinion fixed to said shaft and meshing with said driving gear.

2. In a device of the class described, the combination with a vehicle axle, a steering knuckle including an upstanding spindle pivoted at its upper end to the axle, a road wheel mounted on the steering knuckle, a driving gear carried by the wheel, of an attachment comprising an upstanding post positioned between the gear and spindle and projecting above the axle, means for fastening the lower end of the post directly to the upper portion of the spindle, a bearing member adjustably positioned in the upper end of the post projecting on opposite sides thereof and overlapping the spindle and axle, a pair of shafts journalled within said member and each having a worm in direct driving relation with the other, a spur pinion in one of the shafts meshing with said driving gear, the axis of said shafts being relatively fixed in their angular relation and the other shaft adapted to be connected to a speedometer and extending in the space above the axle at an angle of approximately 120° from the plane containing the driving gear and its pinion whereby the speedometer driving shaft may be located in an available space above the axle and is free to turn with the road wheel.

3. An attachment for a vehicle steering knuckle comprising a single upstanding post broadened transversely and at its lower end to form a jaw plate adapted to extend horizontally, one side of said jaw plate provided with a recess extending parallel to the length of the post and fashioned to fit against one side of the upstanding spindle of the knuckle, a U-bolt for engaging the opposite side of the spindle and passed through the jaw plate to secure the upstanding post in offset relation to the spindle, a one-piece bearing member carried by the post at the upper end thereof, a shaft journalled in said member and provided with a driving pinion, said member being adjustable transversely of the post to locate said pinion and means for securing said member directly to the post in their relatively adjusted positions.

4. An attachment for a vehicle steering knuckle comprising a single upstanding post with its lower end fashioned to fit directly against the upstanding spindle of the knuckle, means for securing said lower end of the post to the spindle, the upper end of the post being split, a one-piece bearing member contained in the split and adjustable transversely of the post and intergeared speedometer driving shafts journalled in said member.

Signed this 19th day of June, A. D., 1922.

FRANK WILLIAM WEST.